United States Patent [19]
Thurston et al.

[11] Patent Number: 5,127,173
[45] Date of Patent: Jul. 7, 1992

[54] VOLUMETRIC FLUID FLOWMETER AND METHOD

[75] Inventors: John F. Thurston, Mesa; Stuart L. Booth, Tempe, both of Ariz.

[73] Assignee: Allied-Signal Inc., Morris Township, Morris County, N.J.

[21] Appl. No.: 596,798

[22] Filed: Oct. 12, 1990

[51] Int. Cl.⁵ .............................................. G01F 5/00
[52] U.S. Cl. ...................................... 73/202; 73/861.19; 73/861.63
[58] Field of Search ................ 73/202, 202.5, 861.19, 73/861.52, 861.61, 861.63, 861.64

[56] References Cited

U.S. PATENT DOCUMENTS

| | | |
|---|---|---|
| 749,645 | 1/1904 | Tuttle ........................ 73/861.64 X |
| 3,238,960 | 3/1966 | Hatch, Jr. ................... 73/861.52 X |
| 3,559,482 | 2/1971 | Baker et al. ................. 73/202 X |
| 3,698,245 | 10/1972 | McNabb . |
| 3,714,828 | 2/1973 | Durkan ....................... 73/861.19 |
| 3,733,901 | 5/1973 | Halmi . |
| 3,948,098 | 4/1976 | Richardson et al. . |
| 4,015,472 | 4/1977 | Herzi . |
| 4,134,297 | 1/1979 | Herzi . |
| 4,420,972 | 12/1983 | Kuroiwa et al. ............. 73/202 X |
| 4,454,758 | 6/1984 | Miller ........................ 73/202 |
| 4,481,828 | 11/1984 | Cheng . |
| 4,508,127 | 4/1985 | Thurston . |
| 4,516,434 | 5/1985 | Halmi . |
| 4,559,832 | 12/1985 | Burlage et al. . |
| 4,648,280 | 3/1987 | Miyoshi et al. . |
| 4,713,538 | 12/1987 | Theocharous . |
| 4,806,016 | 2/1989 | Corpron et al. . |
| 4,823,604 | 4/1989 | Silverwater . |
| 4,854,177 | 8/1989 | Phipps et al. . |
| 4,938,053 | 7/1990 | Jepson et al. ............... 73/202 X |
| 4,949,755 | 8/1990 | Thurston et al. . |

Primary Examiner—Herbert Goldstein
Attorney, Agent, or Firm—James W. McFarland; Robert A. Walsh

[57] ABSTRACT

A volumetric fluid flowmeter and method utilizes a venturi nozzle in the flow being measured, along with a negative feedback fluidic oscillator driven by a small bypass flow diverted from the main flow upstream of the venturi nozzle, and subsequently re-introduced into the main flow in the throat section of the venturi.

9 Claims, 2 Drawing Sheets

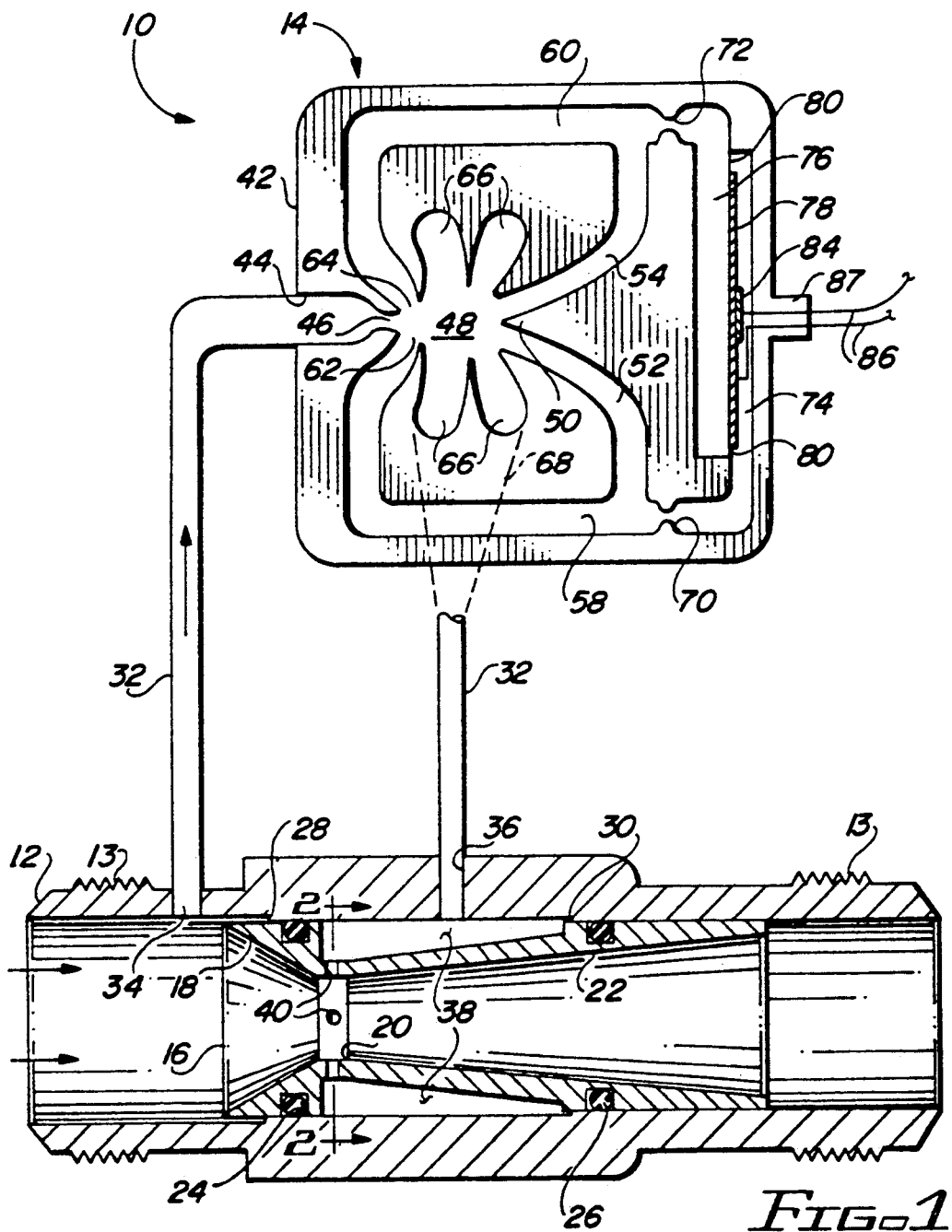
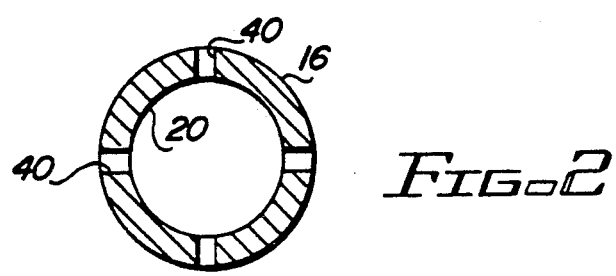

5,127,173

VOLUMETRIC FLUID FLOWMETER AND METHOD

TECHNICAL FIELD

This invention pertains to volumetric fluid flowmeters and relates more particularly to such flowmeters utilizing a venturi nozzle in conjunction with a fluidic negative feedback oscillator.

BACKGROUND OF THE INVENTION

Three known types of volumetric flowmeters include turbine meters, vortex shedding flowmeters, and fluidic, oscillating jet-type flowmeters. In comparison to turbine meters, the fluidic oscillating jet flowmeter offers greater reliability and insensitivity to contamination since the fluidic flowmeter has no mechanical moving parts. The fluidic flowmeter also has a much better frequency response characteristic than a turbine flowmeter since it does not have a major inertial lag function as associated with the rotating turbine flowmeter. Most known turbine flowmeters and fluidic jet oscillating flowmeters are similar in terms of flow turn down ratio, signal amplitude and signal quality, even though the turbine flowmeter in many applications produces less pressure drop in the fluid flow being measured than previous fluidic oscillating jet flowmeters.

Vortex shedding flowmeters are characterized by a bluff body introduced into the fluid flow to be measured to create an alternating series of vortices, externally of the bluff body, that propagate downstream from the bluff body. Such type flowmeters are susceptible to vibration and are very sensitive to system pressure pulsation and flow disturbances, normally requiring a significant amount of electronic signal conditioning to produce a clean output signal. In comparison, a fluidic oscillating jet flowmeter is relatively unaffected by external vibration and may be designed to provide built-in isolation from system pressure pulsations and/or external vibrations.

Examples of flowmeters utilizing fluidic negative feedback oscillators may be found in U.S. Pat. Nos. 4,508,127 and 4,949,755. The latter '755 patent describes an improved fluidic volumetric flowmeter which utilizes a plurality of parallel flow paths, each having a restrictor therein, which flow paths together carry the entire volume of fluid flow being measured. As noted, such structure does have the drawback of producing a relatively significant pressure drop in the fluid flow being measured, which pressure drop represents an unrecovered energy loss.

Other types of volumetric flow sensors operate on the principal of measurement of static pressure differentials and suffer from the inherent difficulties associated with such static pressure measurement systems including insensitivity, limited range, mechanical failures, and limited accuracy. Examples of these include fixed restrictors or orifices generating a continuous pressure drop in the fluid flow being measured, and venturi type pressure pickup measuring devices. The venturi type device does afford the advantage, in comparison to fixed orifice type restrictors, in that a significant portion of the pressure drop occurring through a venturi orifice is subsequently recovered in the downstream diffuser or pressure recovery section of the venturi nozzle.

SUMMARY OF THE INVENTION

It is an object of the present invention to provide an improved volumetric fluid flowmeter and method which combines the desirable characteristics of fluidic jet oscillating flowmeters, and the pressure recovery advantages associated with venturi nozzle type flowmeters.

Another object of the present invention is to provide a volumetric fluid flowmeter of highly compact, lightweight configuration by utilization of an oscillating jet fluidic negative feedback oscillator which is fed by a small portion of the fluid flow being measured, through a bypass passage disposed in parallel with a venturi nozzle situated to carry the fluid flow being measured.

More particularly, the invention contemplates improved apparatus and method incorporating a classical venturi type nozzle within the passage carrying the fluid flow to be measured. A portion of the fluid flow is diverted out of the passage from a location upstream of the venturi nozzle, through an oscillating jet flowmeter which creates a signal indicative of the volumetric fluid flow passing through the main passage. This bypass fluid flow is returned back into the throat section of a venturi nozzle without deleteriously impacting the fluid flow through the venturi itself. The invention is usable with piezoceramic or optical fiber transducers which respectively create electrical and optical output signals indicative of the fluid flow rate being measured. An important aspect of the invention is establishing at the main nozzle of the fluidic oscillator, a flow velocity which is a determinable function of, and preferably equal to, the flow velocity of fluid flow passing through the venturi nozzle.

These and other objects and advantages of the present invention are specifically set forth in or will become apparent from the following detailed description of preferred embodiments of the invention when read in conjunction with the accompanying drawings.

BRIEF DESCRIPTION OF THE DRAWINGS

FIG. 1 is a partially cross-sectional, partially schematic representation of a volumetric flowmeter constructed in accordance with the principles of the present invention;

FIG. 2 is an enlarged, elevational cross-sectional view taken along lines 2—2 of FIG. 1;

DETAILED DESCRIPTION OF THE PREFERRED EMBODIMENTS

Figure 3:
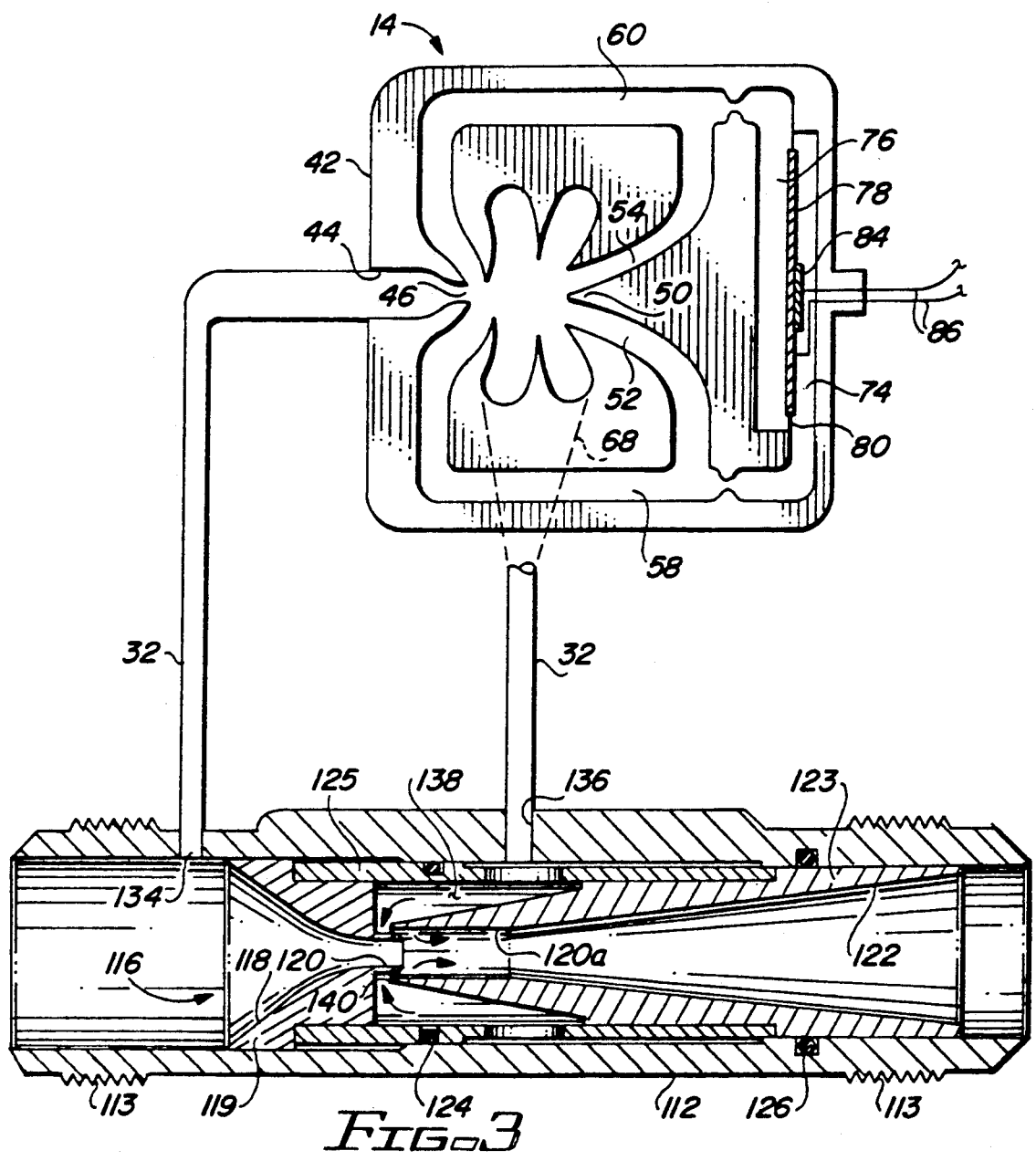
FIG. 3 is a view similar to FIG. 1 but showing an alternate embodiment of the venturi nozzle as contemplated by the present invention.

Referring now more particularly to FIGS. 1 and 2, a fluidic volumetric fluid flowmeter 10 generally includes a fluid flow carrying passage 12 and a fluidic oscillator 14. Fluid flow passage 12 is illustrated as a cylindrical conduit having an internal through passage therewithin for carrying the fluid flow to be measured generally from a leftward to rightward direction in FIG. 1.

Disposed within passage 12 is a venturi nozzle insert 16 tightly mounted within the conduit. Nozzle 16 includes an entry section 18 having an internal, conical passage with a cross-sectional area gradually reducing in the direction of fluid flow therewithin. Immediately downstream of the converging entry section 18 is a throat section 20 of the venturi nozzle illustrated as a fixed cross-sectional area, cylindrical section extending downstream from the entry section. Immediately downstream of the throat section 20 is a diffusion or expansion section 22 of the venturi nozzle 16. The diffuser section 22 is characterized by a conical, diverging cross-sectional area passage whose cross-section smoothly and gradually increases from the minimum cross-sectional area of the throat section 20 back to the internal diameter of passage 12. Venturi nozzle 16 operates as a classic venturi by accelerating the fluid flow as it passes through the throat section 20 to create higher velocity, reduced pressure conditions thereat. Then the fluid flow expands and diffuses in the diffuser section 22 wherein a substantial amount, perhaps up to 75%, of the pressure drop is recovered.

It will be noted that venturi nozzle 16 is tightly mounted within the interior of passage 12 which may include step diameters such as shown as steps 28 and 30 for ease of insertion of sealing 0 rings 24, 26 carried with the venturi nozzle 16 as it is inserted within the interior of passage 12. Conveniently, the passage 12 may have threads 13 at opposite ends for connections to associated conduits.

Passage 12 communicates with oscillator 14 through a bypass passage 32 having a first end communicating with a first bypass flow entry or inlet port 34 in the passage 12 disposed upstream of venturi nozzle 16. Bypass passage 32 extends to a return port 36 in passage 12 communicating with an annular chamber 38 substantially surrounding the throat section 20. Seals 24, 26 isolate chamber 38 which communicates with throat section 20 through a plurality of radial openings 40 (FIG. 2) drilled generally uniformly about the periphery of throat section 20.

The structure and function of fluidic oscillator 14 is similar in many respects to that described in prior U.S. Pat. Nos. 4,949,755, and 4,508,127 which are incorporated herein by reference to the extent necessary for a full understanding of the present invention. More particularly, oscillator 14 includes a housing 42 having an entry or inlet port 44 communicating through bypass passage 32 with the bypass inlet port 34 to receive the diverted, bypassing fluid flow from the passage 12. This bypassing flow is directed to a main nozzle jet 46 of the oscillator, across an interaction region 48 toward a splitter 50. The fluid jet issuing from nozzle 46 is alternately received through receiving ports 52, 54 disposed on opposite sides of splitter 50. Associated with receiving ports 52, 54 are respective negative fluid feedback channels 58 and 60 which extend back to a location adjacent the main nozzle 46. The feedback channels 58, 60 respectively terminate in lateral or side jet control nozzle 62, 64. The interaction region 48 illustrated has four vent lobes 66 from which the collected fluid flow therewithin is vented through a vent port 68 leading to the bypass passage 32 and return port 36. Thus output pressure of fluid flow being exhausted from vent 68 of the fluidic oscillator is maintained at the lower pressure existing at the throat section 20 of the venturi through the communication offered by openings 40 and chamber 38.

In operation as an oscillator, the fluid jet issuing from nozzle 46 causes a rise in pressure at one of the receiving ports 52, 54. Assume, for example, a rise in pressure in receiving port 52. This pressure rise is transmitted through the feedback channel 58 back to control nozzle 62. This increase in pressure at control nozzle 62 deflects the main jet issuing from nozzle 46 toward the opposite receiving port 54. Pressure then increases in receiving port 54, causing a rise in the pressure in feedback channel 60 and lateral control nozzle 64, in turn causing the main jet issuing from nozzle 46 to be deflected back toward receiving port 52. This process repeats itself causing the main jet issuing from nozzle 46 to oscillate between the two output ports 52, 54. The frequency of oscillation is inversely proportional to the transport time of the jet from the exit of nozzle 46 to the entrance to receiving ports 52, 54. Since that distance is fixed, the frequency of oscillation is therefore directly proportional to the velocity of fluid issuing through nozzle 46.

Schematically depicted in FIG. 1 is a sensor arrangement for generating an output signal indicative of the frequency of the pressure oscillations generated within the fluidic oscillator and as occur in the feedback channels 58, 60. Within housing 42 are a pair of pressure chambers 74, 76 respectively communicating with the feedback channels 58, 60 across restrictors 70, 72 which are operable to isolate the pressure chambers 74, 76 from system pressure pulsations and hydraulic resonances. A sensor disc 78 is mounted to housing 42 through an appropriate mount 80, such as Vespel material, to effectively separate, seal and isolate chamber 74 from chamber 76. The opposed faces of disc 78 are exposed to the pressure oscillations transmitted from feedback channels 58, 60 to pressure chambers 74, 76 and disc 78 therefore oscillates at the same frequency. Because the pressure oscillations in channels 58, 60 are 180 degrees out of phase, exposure of the opposed faces of disc 78 to both pressure oscillations thereby increases (doubles) the signal strength driving disc 78 to oscillate. In the arrangement illustrated a piezoceramic transducer element 84 is mounted upon disc 78, and a pair of electrical output signal lines 86 extend through a sealed connector 87 to carry an electrical output signal indicative of the frequency of oscillation of disc 78. The arrangement and configuration of the piezoceramic sensor and an associated disc 78 may be as disclosed in U.S. Pat. No. 4,949,755.

In operation of the FIG. 1 embodiment, the primary portion of fluid flow, whose rate is to be measured, is carried by passage 12 through venturi nozzle 16, setting up therewithin a classical venturi nozzle action. A small portion of the fluid flow is diverted from passage 12 at the first bypass inlet port 34 upstream of nozzle 16 to pass through bypass passage 32 and power the main nozzle 46 of oscillator 14. As previously described, oscillator 14 establishes pressure oscillations within feedback channels 58, 60 which are measured by the sensor means to generate the electrical output signal through output lines 86. Fluid flow in the oscillator 14 is collected in the four vent lobes 66 to be directed through vent 68 and return through bypass passage 32 through the second return port 36 and ultimately into the throat section 20 of venturi nozzle 16 by flowing through openings 40. Oscillator 14 is closely coupled to the passage 16 such that the density, temperature conditions of fluid flow through the main nozzle 46 of oscillator 14 duplicates those of the fluid flow passing through venturi nozzle 16. Because the fluid vented from oscillator 14 is reintroduced into the throat section 20 of nozzle 16, other variables in the Bernoulli equations governing fluid flow through nozzles are also equal at nozzles 16 and 46. Accordingly, the flow velocity of fluid passing through the main nozzle 46 of oscillator 14 is equal to the flow velocity of the fluid flow passing through venturi nozzle 16. Thus the signal generated by the piezoceramic sensor is directly indicative of the flow velocity passing through venturi nozzle 16. Since the areas of both nozzle 46 and venturi nozzle 16 are fixed, though different, the signal is therefore indicative of the fluid flow rate through passage 12.

The configuration illustrated in FIG. 1 is also operable to assure that a constant percentage of fluid flow carried in passage 12 is bypassed or diverted through bypass passage 32 through the oscillator 14. Typically this percentage of bypass flow would be less than ten percent down to approximately one percent of the primary fluid flow passing through passage 12.

It is important to operation of the FIG. 1 flowmeter that the bypass fluid flow being re-introduced into the throat section 20 of the venturi nozzle not perturb or interrupt the flow conditions therein to the extent that the fluid flow in nozzle 16 does not obey the Bernoulli equations. To this extent, the arrangement illustrated in FIG. 1 contemplates a constant percentage flow on the order of about one percent passing through the bypass passage 32 to be re-introduced through openings 40 into the throat section 20. Openings 40 are merely cross drilled holes which open into throat section 20 in a direction perpendicular to the primary fluid flow therethrough. The openings 40 are uniformly distributed about the periphery of section 20, and such arrangement has been found effective to allow re-introduction of the bypassed fluid flow into the throat section 20 without significant perturbation of the fluid flow conditions therewithin.

The arrangement illustrated in FIG. 1 is conducive to a highly compact, light-weight and economical configuration for manufacture of a fluid flow meter. In this respect the fluidic oscillator 14 is typically constructed as a stack of very thin laminates. The sensor disc 78 may preferably be constructed in a plane parallel to the plane of the oscillator, rather than perpendicularly thereto as illustrated schematically for purposes of clarity in FIG. 1.

FIG. 3 illustrates an alternate arrangement for construction of the venturi nozzle and is particularly suitable for re-introduction of higher percentages of bypass fluid flow. The FIG. 3 arrangement includes a passage 112 very similar in configuration and operation to the passage 12 of FIG. 1, along with the same fluidic oscillator 14 communicating with the internal fluid flow passage within conduit 112 by way of a bypass passage 32. Accordingly, the operation of the FIG. 3 arrangement in generating an output signal through wires 86 indicative of the volumetric fluid flow rate through passage 112 is the same as discussed above with respect to the FIG. 1 arrangement, inasmuch as the diverted fluid flow is picked up through the first bypass entry port 134 disposed upstream of the venturi nozzle, and returned through a second entry port 136 which ultimately returns the bypass fluid flow to the throat section of a venturi nozzle as will be described below.

Venturi nozzle 116 is conveniently constructed from three bodies including an upstream member 119, a downstream member 123, and a cylindrical sleeve section 125 rigidly intersecuring the three members as a single body. Upon insertion of nozzle 116 into the interior of passage 112, the O-rings 124, 126 effectively seal a central chamber 138 communicating with the second bypass return port 136 through openings in the sleeve 125. The upstream body 119 has an interior passage 118 configured to define the entry section of the venturi nozzle with a gradually reducing, converging cross-sectional area leading to a smaller diameter neck 120 protruding downstream in overlapping relationship to the downstream body 123. Body 123 has internal passages defining the throat section 120a of the venturi nozzle as a fixed cross-sectional area opening, as well as the downstream diverging portion 122 defining the pressure recovery or diffuser section of the venturi nozzle. The overlap between neck 120 extending slightly inside the throat section 120a defines therebetween an annular ring-like opening 140 through which the bypass fluid flow received in chamber 138 is directed back into the throat section 120a. Importantly, this arrangement allows the returning bypass flow to be introduced into the primary fluid flow within the throat 120a in a direction substantially parallel to the primary fluid flow passing therethrough. This arrangement permits a higher percentage of bypass fluid flow to be re-introduced into the throat section 120a without perturbation of the fluid flow characteristics therewithin, and is particularly suitable for measurement of lower flow rates wherein the constant percentage fluid flow bypass through bypass passage 32 may be up to approximately ten percent of the primary fluid flow passing through passage 112. As noted, the arrangement in FIG. 3 operates in the same manner as that described above with respect to FIG. 1, with substantial pressure recovery of the pressure drop occurring within the downstream diffuser section 122 to minimize pressure and energy losses created by the flowmeter itself.

Figure 4:
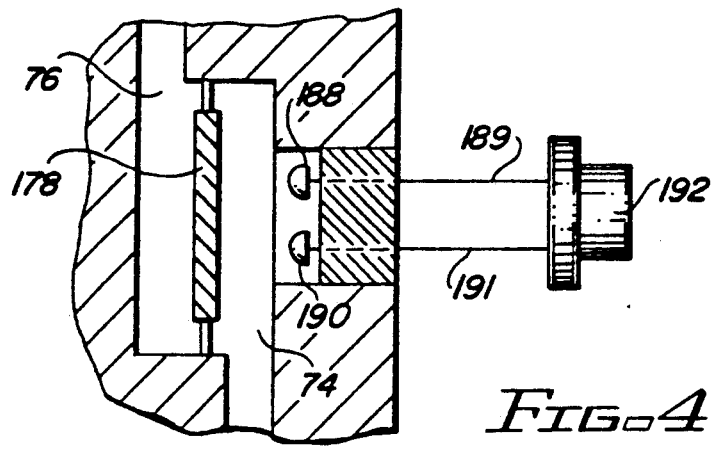
FIG. 4 illustrates an alternate fiberoptic sensor useful in either the FIG. 1 or FIG. 3 embodiments.

FIG. 4 illustrates an alternative arrangement for sensing the pressure oscillations set up in the pressure chambers 74, 76 of either the FIG. 1 or FIG. 3 0 arrangements. Specifically, the arrangement illustrated in FIG. 4 includes an LED light source 188 fed through a single optical fiber 189 to emit light upon an optically reflective disc 178. Disc 178 is mounted similarly to the disc 78 illustrated in FIGS. 1 and 3 so as to oscillate in response to the pressure oscillations within chambers 74, 76. Reflected light is received through one or more optical receivers 190 and transmitted through associated fibers 191 to an optical output connector 192. The optical sensor arrangement illustrated in FIG. 4 is effective to generate an optical output signal, in known manner, which is indicative of the frequency of the pressure oscillations imposed upon disc 178. The optical arrangement of FIG. 4 provides the additional advantage, in comparison to the piezoceramic electrical sensor, of insensitivity to electromagnetic interference.

From the foregoing it will be apparent that the present invention also contemplates an improved method for sensing volumetric fluid flow through the fluid carrying passage 12 or 112 by directing a primary portion of this fluid flow through a venturi nozzle 16 or 116 having an associated constant diameter throat section. A small constant percentage of this fluid flow is diverted out of the passage from a location upstream of the venturi. This diverted flow is then directed through the main nozzle 46 of the fluidic feedback oscillator 14 with the velocity of the fluid flow issuing from the jet of this main nozzle 46 being equal to the velocity of fluid flow passing through the venturi 16 or 116. The oscillator 14 develops pressure oscillations within the feedback channels 58, 60 which are indicative of the velocity of fluid flow through the main nozzle and therefore the passage 12, 112. The frequency of these pressure oscillators are sensed through the sensor 84 or 190.

Importantly, the bypass fluid flow passing through the oscillator 14 returns through passage 32 back into the throat section 20 or 120a of the venturi nozzle. As mentioned up to about ten percent and preferably one percent is the desired constant percentage of fluid flow diverted through bypass passage 32 when the fluid flow is directed back into the throat 20 of FIG. 1 in a direction perpendicular to the primary fluid flow therethrough, while higher percentages of bypass flow may be re-introduced into the coannular opening associated with throat 120a of the FIG. 3 arrangement.

While specific arrangements have been described above in detail, various alterations and modifications will be apparent to those skilled in the art. For example, the sensor arrangement associated with fluidic oscillator 14 may be of the type illustrated in prior U.S. Pat. No. 4,949,755. Accordingly, such alterations and variations are within the scope of the present invention to the extent they do not depart from the scope and spirit the appended claims.

Having described the invention with sufficient clarity that those skilled in the art may make and use it, what is claimed is:

1. A volumetric fluid flowmeter comprising:
    a passage adapted to carrying pressurized fluid flow;
    a venturi nozzle disposed in said passage having an entry section of gradually reducing cross-sectional area in the direction of fluid flow, a throat section fixed in cross sectional area extending downstream from the entry section, and a diffuser section extending downstream of said throat section and having a gradually increasing cross-sectional area in the direction of fluid flow, said passage having a bypass flow inlet port upstream of said entry section of said venturi nozzle, and a bypass flow return port communicating with said throat section;
    a bypass duct extending from said inlet port to said return port and adapted to carry a substantially constant percentage of the pressurized fluid flow in the passage in parallel flow, bypassing relationship to said entry section of the venturi nozzle;
    a fluidic negative feedback oscillator having no mechanical moving parts disposed in said bypass duct, said oscillator including a housing defining an entry port communicating with said bypass inlet port, a main nozzle through which the bypass fluid flow is directed toward a flow splitter at a velocity equal to the velocity of fluid flow through said throat section, a pair of receiving ports on opposite sides of said splitter, flow feedback channels extending from said receiving ports back to associated lateral control nozzles adjacent said main nozzle, said oscillator operable to develop substantially identical pressure oscillations in said feedback channels 180° out-of-phase with one another, the frequency of said oscillations being indicative of said velocity of fluid flow through said main nozzle, said housing further defining a pair of opposed pressure chambers respectively communicating with said feedback channels;
    a disc mounted upon said housing with opposed faces exposed to said pair of pressure chambers to mechanically oscillate in response to said pressure oscillations; and
    means for sensing the frequency of oscillation of said disc.

2. A volumetric fluid flowmeter as set forth in claim 1, wherein said venturi nozzle includes a cylindrical wall disposed within said passage to define said throat section within the interior of said wall and to define an internal chamber between said wall and said passage in surrounding relation to said throat section.

3. A volumetric fluid flowmeter as set forth in claim 2, wherein said wall includes a plurality of openings disposed uniformly circumferentially thereabout and opening into said throat section perpendicularly to the direction of fluid flow through said throat.

4. A volumetric fluid flowmeter as set forth in claim 2, wherein said venturi nozzle further includes a reduced diameter neck upstream of said wall to define an annular opening between said wall and said neck extending parallel to the direction of fluid flow through said throat.

5. A volumetric fluid flowmeter as set forth in claim 1, wherein said means for sensing includes a piezoceramic transducer mounted on said disc for generating an electrical signal indicative of said frequency of oscillation of the disc.

6. A volumetric fluid flowmeter as set forth in claim 1, wherein said means for sensing includes an optical transducer for generating an optical output signal indicative of said frequency of oscillation of the disc.

7. A volumetric fluid flowmeter comprising:
    a passage adapted to carry pressurized fluid flow;
    a venturi nozzle disposed in said passage having an entry section of gradually reducing cross-sectional area in the direction of fluid flow, a throat section fixed in cross sectional area extending downstream from the entry section, and a diffuser section extending downstream of said throat section and having a gradually increasing cross-sectional area in the direction of fluid flow, said passage having a bypass flow inlet port upstream of said entry section of said venturi nozzle, and a bypass flow return port communicating with said throat section;
    a bypass duct extending from said inlet port to said return port and adapted to carry a substantially constant percentage of the pressurized fluid flow in the passage in parallel flow, bypassing relationship to said entry section of the venturi nozzle;
    a fluidic negative feedback oscillator disposed in said bypass duct, said oscillator including a housing defining an entry port communicating with said bypass inlet port, a main nozzle through which the bypass fluid flow is directed toward a flow splitter, a pair of receiving ports on opposite sides of said splitter, flow feedback channels extending from said receiving ports back to associated lateral control nozzles adjacent said main nozzle, said oscillator operable to develop substantially identical pressure oscillations in said feedback channels 180° out-of-phase with one another, said housing further defining a pair of opposed pressure chambers respectively communicating with said feedback channels;
    a disc mounted upon said housing with opposed faces exposed to said pair of pressure chambers to mechanically oscillate in response to said pressure oscillations; and
    means for sensing the frequency of oscillation of said disc.

8. A volumetric fluid flowmeter as set forth in claim 7, wherein said venturi nozzle includes a cylindrical wall disposed within said passage to define said throat section within the interior of said wall and to define an internal chamber between said wall and said passage in surrounding relation to said throat section.

9. A volumetric fluid flowmeter as set forth in claim 8, wherein said venturi nozzle further includes a reduced diameter neck upstream of said wall to define an annular opening between said wall and said neck extending parallel to the direction of fluid flow through said throat section.

* * * * *